(12) United States Patent
Goossens

(10) Patent No.: US 6,227,627 B1
(45) Date of Patent: May 8, 2001

(54) HYDRAULIC MOTOR VEHICLE BRAKING SYSTEM WITH WHEEL SLIP CONTROL

(75) Inventor: Andre F. L. Goossens, Rumst (BE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/202,857

(22) PCT Filed: May 9, 1997

(86) PCT No.: PCT/EP97/02382

§ 371 Date: Jul. 9, 1999

§ 102(e) Date: Jul. 9, 1999

(87) PCT Pub. No.: WO97/49587

PCT Pub. Date: Dec. 31, 1997

(30) Foreign Application Priority Data

Jun. 21, 1996 (DE) .............................................. 196 24 753

(51) Int. Cl.[7] ...................................................... B60T 8/44
(52) U.S. Cl. ..................................... 303/113.1; 303/116.2
(58) Field of Search .............................. 303/113.1, 116.1, 303/116.2, 119.2, DIG. 10, DIG. 11, 87; 251/129.02, 129.05, 129.07

(56) References Cited

U.S. PATENT DOCUMENTS

| | | | |
|---|---|---|---|
| 5,174,636 | * 12/1992 | Burgdorf et al. | 303/116.1 |
| 5,474,106 | * 12/1995 | Burgdorf et al. | 137/495 |
| 5,486,040 | * 1/1996 | Beck et al. | 303/116.1 |
| 5,538,334 | * 7/1996 | Kushi et al. | 303/116.1 |
| 5,673,978 | * 10/1997 | Linkner, Jr. | 303/116.1 |
| 5,683,150 | * 11/1997 | Burgdorf et al. | 303/116.1 |
| 5,887,956 | * 3/1999 | Rausch | 303/119.2 |
| 5,934,766 | * 8/1999 | Feigel et al. | 303/119.2 |
| 5,975,654 | * 11/1999 | Zaviska et al. | 303/119.2 |
| 6,135,579 | * 10/2000 | Beck | 303/116.1 |

FOREIGN PATENT DOCUMENTS

| | | |
|---|---|---|
| 4023302 | 4/1991 | (DE) . |
| 4006858 | 9/1991 | (DE) . |
| 4100389 | 7/1992 | (DE) . |
| 4319227 | 12/1994 | (DE) . |
| 19529895 | 2/1996 | (DE) . |
| 95/09099 | 4/1995 | (WO) . |

* cited by examiner

Primary Examiner—Christopher P. Schwartz
(74) Attorney, Agent, or Firm—Rader, Fishman & Grauer PLLC

(57) ABSTRACT

A hydraulic automotive brake system with wheel slip control, includes a pressure medium source, to which a main pressure line is connected, which leads to a wheel brake, first and second pressure relief line segments connected to the wheel brake and leading to a supply reservoir, and having a pressure modulation valve arranged in it that either separates the supply reservoir from the wheel brake or connects it to the wheel brake, as well as a control orifice valve that is arranged in the main pressure line upstream of the first pressure relief line segment, actuated by changes in the hydraulic pressure. The brake system features a pressure chamber that actuates the control orifice valve and is provided with check valves, of which one of the check valves separates the pressure chamber from a pressure medium branch of the main pressure line arranged upstream of a control orifice, the other check valve connects the pressure chamber to the connection of the pressure relief line segment to the wheel brake, and whereby a final control element is guided in a sealed manner in the first pressure chamber and is exclusively exposed to pressure from the pressure medium source in the one direction of actuation of the control orifice valve, and in the other direction of actuation is exposed to the pressure change in the pressure chamber.

10 Claims, 3 Drawing Sheets

HYDRAULIC MOTOR VEHICLE BRAKING SYSTEM WITH WHEEL SLIP CONTROL

BACKGROUND OF THE INVENTION

The invention relates to a hydraulic automotive brake system with wheel slip control, with a pressure medium source onto which a main pressure line is connected, which leads to a wheel brake, with a pressure relief line that connects to the wheel brake and to a supply reservoir, and in which a pressure modulation valve is arranged that either separates the supply reservoir from the wheel brake or connects it to the wheel brake, as well as with a control orifice valve arranged in the main pressure line upstream of the pressure relief line, actuated by a change in the hydraulic pressure.

A brake system of the above indicated type has become known from DE 43 19 227 A1, with a pressure medium source to which a main pressure line is connected, leading to a wheel brake. In turn, the wheel brake has a connection for a pressure relief line which leads to a low pressure reservoir through an electromagnetically actuated outlet valve. A hydraulic pump is connected downstream of the low pressure reservoir, leading the pressure medium of the low pressure reservoir back to the main pressure line, which is connected to a brake pressure transducer. The brake pressure transducer as well as the hydraulic pump are to be regarded as pressure medium sources to supply the wheel brakes. An electromagnetically actuated inlet valve is located in the main pressure line, between the connection of the auxiliary pressure pump to the main pressure line and the connection of the outlet valve to the main pressure line, with an orifice control valve following downstream of the inlet valve in the main pressure line. This orifice control valve is hydraulically actuated interdependent with the pressure difference before and after the inlet valve. The orifice control operation is hereby subject to the influence of the dynamic pressure drop inside the inlet valve. Correspondingly, to operate this orifice control valve, a relatively high switching pressure is required, the lowering of which would prove to be expedient.

Therefore, the object of the present invention is to fundamentally improve a hydraulic automotive brake system with wheel slip control of the generic type, such that a control orifice operation can be created that is simple to realize with as little medium use as possible, said operation, moreover, being characterized by the most simple, rapid and operationally reliable mode of operation.

SUMMARY OF THE INVENTION

This object is achieved according to the invention by a brake system that features a pressure chamber and check valves, one of which separates the pressure chamber from a connection of the main pressure line arranged upstream of the control orifice, the other check valve connecting the pressure chamber to the connection of the pressure relief line to the wheel brake, that a final control element is guided in a sealed manner in the pressure chamber, and in one direction of actuation of the control orifice valve this final control element is exposed exclusively to the pressure of the pressure medium source, while in the other direction of actuation it is exposed to the pressure change in the pressure chamber after the pressure modulation valve has been opened.

Further characteristics, advantages and possible applications of the invention are explained in more detail in the following on the basis of three exemplified embodiments.

DETAILED DESCRIPTION OF THE DRAWINGS

Figure 1:
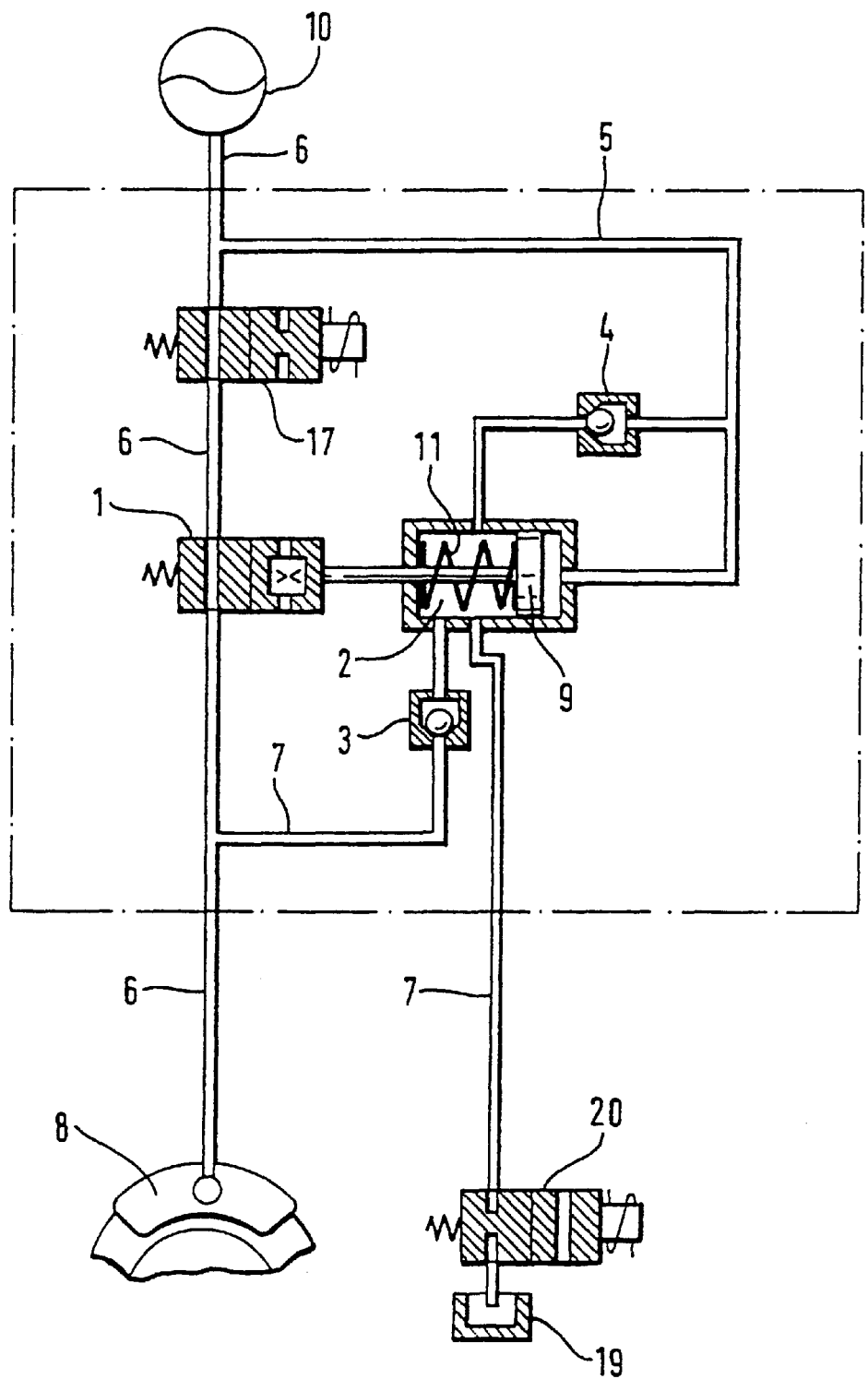
FIG. 1 shows a hydraulic schematic for the object according to the invention.

The hydraulic schematic according to FIG. 1 shows the characteristics that are essential to the invention, according to which a main pressure line 6 is connected to a pressure medium source 10 and leads to a wheel brake 8. With a pressure relief line 7 that is connected to the wheel brake 8 and leads to a reservoir 19, and in which a pressure modulation valve 20 that is closed when in the normal setting is arranged in the form of a wheel brake outlet valve. An orifice control valve 1 is located in the main pressure line 6 upstream of the connection of the first pressure relief line segment 7' to the main pressure line, said orifice control valve according to the invention having a pressure chamber 2 allocated to it, onto which check valves 3, 4 are connected.

One of the check valves 4 has the task of separating a pressure medium branch 5 attached to the main pressure line 6 upstream of the control orifice valve 1 from the pressure chamber 2. The other check valve 3 connects the connection of the pressure relief line coming from the wheel brake 8 to the pressure chamber 2. Furthermore, a final control element 9 is located in the pressure chamber 2, guided into it in a sealed manner and represented symbolically as an actuating piston. This final control element 9 is coupled to the control orifice valve 1 in FIG. 1 by means of a rod for a better overview of the operation. In the one direction of actuation of the control orifice valve 1 the piston of the final control element 9 is acted on exclusively by the pressure of the pressure medium source 10 via the pressure medium branch 5, while in the opposite direction of actuation—after the opening of the pressure modulation valve 20—the pressure change and thereby the drop in pressure in the pressure chamber 2 acts to switch on the orifice operation. The final control element 9 and thus the control orifice valve 1 is positioned in its non-active normal setting by means of a spring 11 tensed inside the pressure chamber 2 and supported on the final control element 9. The control orifice valve 1 thereby also persists in the throttle-free setting when there is a condition of no hydraulic pressure. In the hydraulic schematic the check valve 4 connected in a permanent manner to the pressure medium source 10 is inserted in a separate line connected to the pressure chamber 2. As the further exemplified embodiments show, it can also be attached to the piston of the final control element 9. Furthermore, upstream of the control orifice valve 1 an electromagnetically actuated inlet valve (pressure modulation valve 17) is shown. However, in corresponding agreement with the previously described operating elements, this is not a necessary component of the brake system that is required in order to execute a pressure reduction or pressure build-up phase during wheel slip control. A consequence of this is that the previously used inlet valve upstream of the wheel brake 8 can be eliminated, since the pressure build-up and pressure reduction phases necessary for wheel slippage control are realized by the control phases of the pressure modulation valve 20 connected down-line of the pressure chamber 2. Comparatively good brake pressure control results can thus be achieved, which can be supplemented, either as desired or as required, by a precise pressure maintenance phase through the additional use of pressure modulation valve 17 that acts as an inlet valve. When using the pressure modulation valve 17, the control orifice valve 1 along with the final control element 9 and the check valves 3, 4 form an integrated, structural space-optimizing unit, the construction of which is explained in the following FIG. 2.

Figure 2:
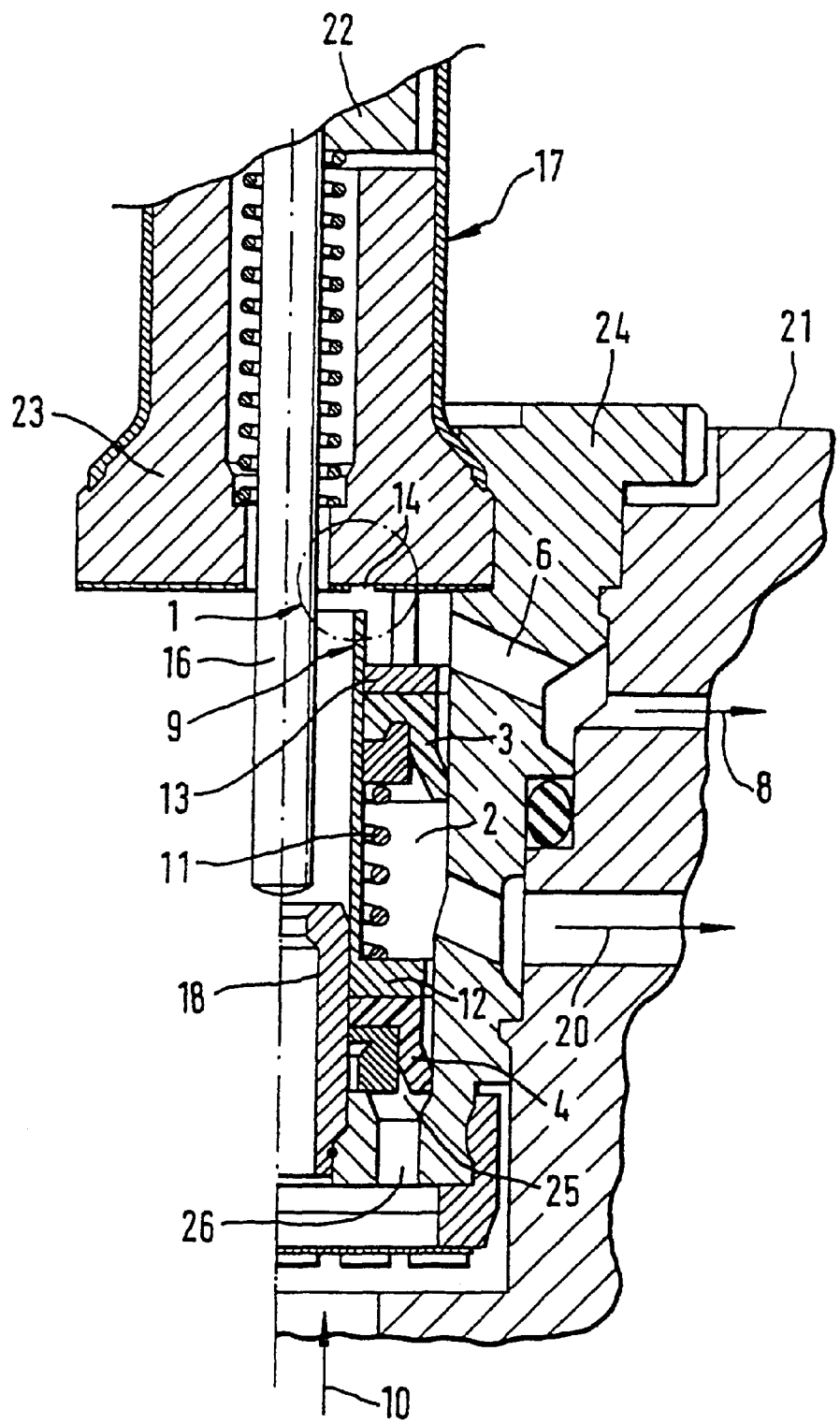
FIG. 2 shows a first embodiment of the control orifice, integrated into an electromagnetically actuated inlet valve of the brake system.

FIG. 2 shows a partial, sectioned illustration through a pressure modulation valve 17 employed as a cartridge valve in a valve block housing 21. The valve push rod 16 connected to the magnet armature 22 extends through a magnet core 23 into a hollow space of the valve cartridge 24, in the underside of which a shell-forming valve seat body 18 is fastened. The valve seat body 18 is connected, at its lower section, to the valve cartridge 24 that is also shell-shaped and stepped, whereby an annular space 25 remains between the valve seat body 18 and the valve cartridge 24, in which space an annular collar that forms the check valve 4 is arranged. Above the check valve 4 there is a final control element 9 that, together with the check valve 4, forms an annular piston 12 sealed off in the annular space 25 of the valve cartridge 24. The sealing lip on the annular piston 12, as a result of a bore hole 26 that extends in the annular space 25 of the valve cartridge 24, is directly exposed to the pressure of the pressure medium source 10, while the other check valve 3 in the form of a ring collar is arranged on the shell forming section above the annular piston 12. The check valve 3 blocks the pressure chamber 2 positioned between the two ring collars in the direction of the section of the main pressure line 6 that leads to the wheel brake 8. This check valve 3 is fixed to the valve cartridge 24 by means of an annular part 13 that is attached to the housing This check valve 3 makes the exclusively pressure medium flow possible from the pressure medium source 10 via the valve push rod 16 raised from the valve seat body 18 according to the illustration, to the wheel brake 8 and into the pressure chamber 2. The pressure chamber 2 is structurally delimited from the shell-forming final control element 9 and the ring collars adjacent to the wall of the valve cartridge 24. At the same time, the pressure chamber 2 contains the spring 11, which adjoins the shoulder of the final control element 9 with its one spring end, and with the other spring end adjoins the support ring of the check valve 3. A bore hole passage in the valve cartridge 24 at the level of the pressure chamber 2 leads to pressure modulation valve 10 that is closed when in the normal position, while in the blocked setting of said pressure modulation valve 20 pressure medium of the pressure medium source 10 is under pressure between it and the pressure chamber 2. For the time being, in order to permit the control orifice function to remain inoperative, a hydraulic pressure force that is smaller by the spring force than the force that is exerted during normal braking by the hydraulic pressure force generated by the pressure medium source 10 is sufficient in pressure space 2. The annular piston 12 that acts as an operating piston is only displaced in the direction toward the magnet core 23 after the pressure modulation valve 20 that is blocked in the normal setting makes possible an escape of pressure medium from the pressure chamber 2 to the supply reservoir 19. As the shell shaped final control element 9 moves in the direction toward the magnet core 23, the passage cross section between the shell-shaped end and the front face of the magnet core 23 turned toward it diminishes to the dimension of one or more orifice openings 14, as a result of which the fluid coming from the pressure medium source 10 is limited in its flow rate through to the wheel brake 8. The flow rate through the control orifice can be adjusted by means of the shell gap of the final control element 9 from the magnet core 23, as well as by the appropriate structural modification, for example in a photo-technical way by means of etching the orifice openings 14, and orifice channels are put into a thin, sheet metal part 15 that is adjacent to the magnet core 23 In this way cost-effective, discretionary selections can be achieved by manufacturing thin, sheet metal parts 15 with varying orifice openings 14. As an alternative to the etching process the orifice opening 14 can, for example, be applied as a bore or a slot in the shell shaped end of the final control element 9.

The change-over pressure of the orifice valve 1 in the orifice setting is relatively small, since large annular collars can be used as a result of the structural design of the check valves 3, 4, whereby the slight force of the spring 11 is relatively small and is thereby to be viewed as advantageous for the change-over behavior in the orifice setting. The result is a compact, integrated, quasi-static control orifice valve 1 as derived from the structural embodiment as well as from FIG. 1, the control orifice of which does not switch under the influence of the dynamic pressure drop through the electromagnetic inlet valve (pressure modulation valve 17) As a result of the fact that the control orifice valve 1 at this stage can be switched into the orifice stetting independent of the dynamic pressure drop through the electromagnetically actuated inlet valve, the calibration measures previously common, for example by using a series of orifices, can be eliminated. Considering the very small change-over pressure in the orifice setting, reliable and comfortable operation thus results.

Figure 3:
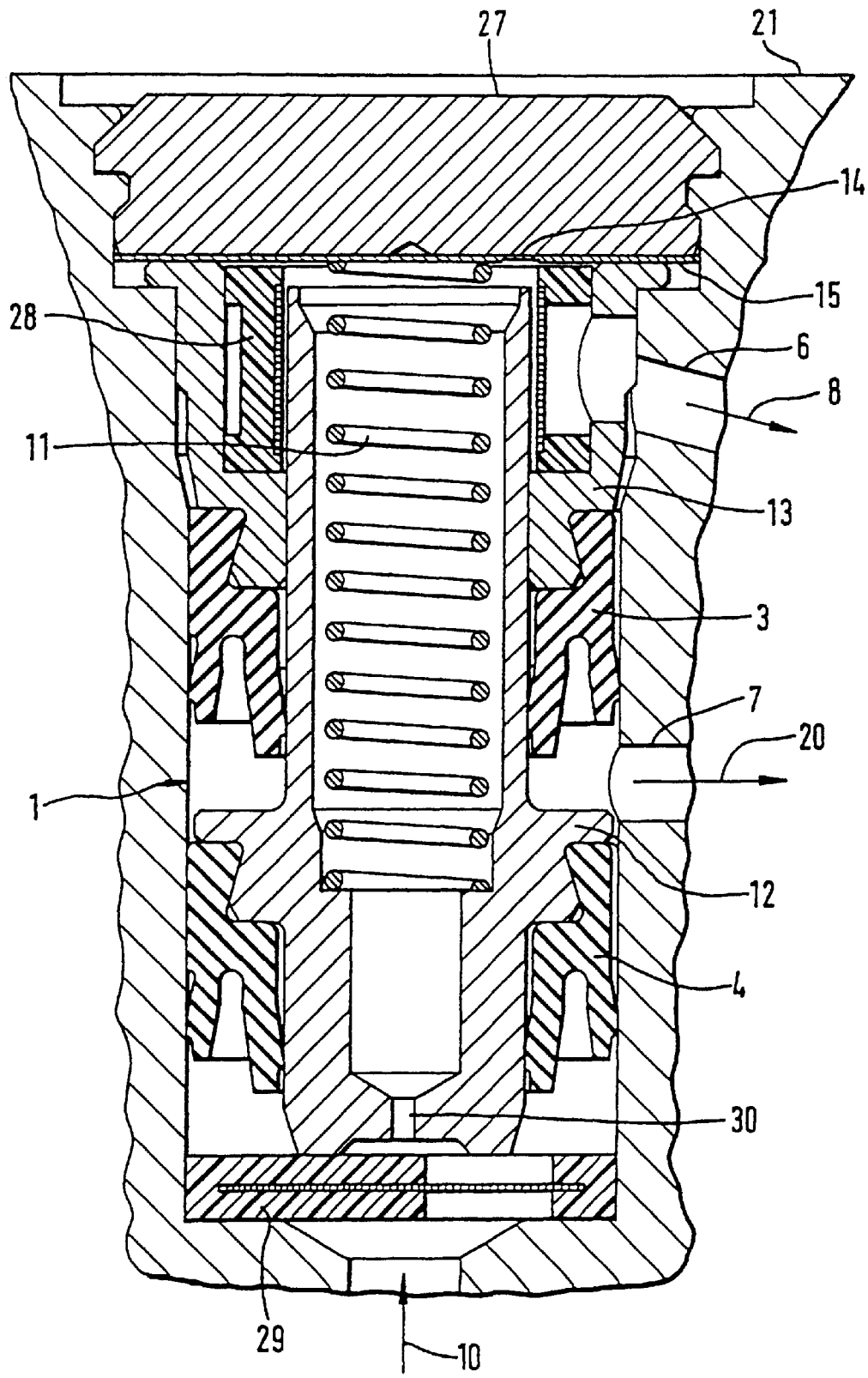
FIG. 3 shows a further structural embodiment of the control orifice.

To the extent that the electromagnetic inlet valve (pressure modulation valve 17) is not used for brake pressure control, a hydraulic brake system results that has wheel slip control with a reduced number of solenoid valves, which can lead to the construction of the control orifice valve 1 as illustrated in FIG. 3.

FIG. 3 shows an expedient embodiment of the control orifice valve 1 integrated into a preferably block-shaped valve block housing 21 of the slip regulated brake system. The receiving housing for the control orifice valve 1 features a blind bore into which a main pressure line 6 connected to the wheel brake 8 discharges laterally, and there is a connection to the pressure chamber 2 by means of the check valve 3 adjacent to the section of the main pressure line 6. The second pressure relief line segment 7" discharging laterally into the pressure chamber 2 is connected to the pressure modulation valve 20. The check valve 3 is equivalent to the embodiment according to FIG. 2, designed as a ring collar that is fastened to one shell-shaped annular part 13, which is fixed between a step of the bore and a cover 27 that covers the blind bore. Equally, the annular part 13 at its interior receives an annular filter 28, which keeps impurities in the pressure medium coming from the wheel brake 8 from the orifice openings 14. Furthermore, at the end of the blind bore hole there is a plate filter 29 which also assures that dirt particles brought from the pressure medium source 10 into the main pressure line 6 are kept from the annular piston 12 and thereby from the check valves 3, 4 and the orifice openings 14. The annular piston 12 is designed shell-shaped over nearly its entire section, so that this receives the spring 11 in its interior, said spring being supported on the front face of the cover 27 with its end that faces away from the annular piston 12, The orifice openings 14 in the present case are imbedded in a thin, sheet metal part 15 by means of an etching process, said thin sheet metal part being clamped between the annular part 13 and the cover. Alternatively, however, it is possible that one or more orifice openings 14 are imbedded in the end area of the shell shaped section on the annular piston 12. From the drawing it becomes evident that the shell shaped section at the annular piston 12 is guided in the annular part 13. The ring collar (check valve 4) acted on immediately after the plate filter 29 in the direction of closing by the pressure medium in the main pressure line 6 is also inserted in a recess on the expanded part of the annular piston 12, in the same manner as the check valve 3.

In the operational release position, which corresponds to the normal position of the control orifice valve 1 as illustrated, the area of the annular piston 12 that receives the check valve 4 is supported on the plate filter 29. Upon actuation of the brake and thereby an executed pressure build up in the main pressure line 6, the pressure medium extends through the hollow area of the annular piston 12 and through the annular filter 28 to the wheel brake 8, as well as through the intermediate space of the sealing lip on the check valve 3 and the housing walls, into the pressure chamber 2. The pressure medium disseminates from there through the second pressure relief line segment 7" to the pressure modulation valve 20, which is closed in the normal setting. Since the same brake pressure exists on both sides of the check valve 4 and the annular piston 12 is pressure-equilibrated, this persists in the normal setting as illustrated. Upon the electromagnetic opening of the pressure modulation valve 20 a pressure gradient results in the pressure chamber 2, whereby the annular piston 12 is no longer pressure equilibrated. This moves, as a consequence of the pressure force generated by the pressure medium source 10 with its shell shaped section acting on the thin, sheet metal part 15. The pressure medium that flows into the hollow space of the annular piston 12 through the calibration opening 30 thus extends exclusively in the direction of the main pressure line 6 that leads to the wheel brake 8 through orifice opening 14, and thereby through the check valve 3 in the direction of the opened pressure modulation valve 20. As a result of the fact that the orifice opening cross section 14 is considerably smaller than the opening cross section of the pressure modulation valve 20, the pressure decreases in the wheel brake 8 in the direction of the pressure-less supply reservoir 19, which corresponds to a low pressure reservoir in a brake system that functions according to a recirculating principle. The brake pressure decrease in the associated wheel brake 8 is accomplished as a result of the change-over setting of the control orifice valve 1 as described at this stage. A new build up of brake pressure in the wheel brake 8 requires the reversal of the pressure modulation valve 20 into the blocking position, whereby renewed filling of the pressure chamber 2, along with the action of the spring 11, causes the ring piston 12 to travel back into its illustrated normal setting, A rapid release of the wheel brake 8 is accomplished by the overflow of the two check valves 3, 4 in the direction of the pressure medium source 10, as soon as the pressure level in the pressure medium source 10, that is, in the master cylinder, is lowered by means of the release of the brake pedal. With regard to the construction illustrated according to FIG. 3, a particularly compact unit results for the control orifice valve 1, since all essential, previously described individual elements that are rotationally symmetrical and coaxially interstaged are arranged in a blind bore hole. The same system characteristics also result for the embodiment according to FIG. 2.

REFERENCE LIST 1. control orifice valve
2. pressure chamber
3. check valve
4. check valve
5. pressure medium branch
6. main pressure line
7. pressure relief line
7'. first pressure relief line segment
7". second pressure relieve line segment
8. wheel brake
9. final control element
10. pressure medium source
11. spring
12. annular piston
13. annular part
14. orifice opening
15. thin sheet metal part
16. valve push rod
17. pressure modulation valve
18. valve seat body
19. supply reservoir
20. pressure modulation valve
21. valve block housing
22. magnet armature
23. magnet core
24. valve cartridge
25. annular space
26. bore hole
27. cover
28. annular filter
29. plate filter
30. calibration opening

REFERENCE LIST 1. control orifice valve
2. pressure chamber
3. back pressure valve
4. back pressure valve
5. pressure medium branch
6. main pressure line
7. pressure medium drain line
8. wheel brake
9. final control element
10. pressure medium source
11. spring
12. annular piston
13. annular part
14. orifice opening
15. thin sheet metal part
16. valve push rod
17. pressure modulation valve
18. valve seat body
19. supply reservoir
20. pressure modulation valve
21. valve block housing
22. magnet armature
23. magnet core
24. valve cartridge
25. annular space
26. bore hole
27. cover
28. annular filter
29. plate filter
30. calibration opening

What is claimed is:

1. A hydraulic automotive brake system with wheel slip control, comprising:
    a pressure medium source onto which a main pressure line is connected, which leads to a wheel brake, a pressure relief line including first and second pressure relief line segments, wherein said first and second relief line segments connect the wheel brake to a supply reservoir, a pressure modulation valve coupled to said main pressure line that either separates the supply reservoir from the wheel brake or connects it to the wheel brake, a control orifice valve arranged in the main pressure line upstream of the pressure relief line, actuated by a change in the hydraulic pressure, a pressure chamber and first and second check valves, wherein said first check valve separates the pressure chamber from a connection of the main pressure line, and wherein the second check valve is disposed within the first segment of the pressure relief line, wherein said first segment of said pressure relief line extends from said pressure chamber to said main pressure line a final control element guided in a sealed manner in the pressure chamber, wherein in a first direction of actuation of the control orifice valve the final control element is exposed exclusively to the pressure of the pressure medium source, and a second direction of actuation the final control element is exposed to the pressure change in the pressure chamber after the pressure modulation valve has been opened.

2. A brake system according to claim 1, wherein the final control element positions the control orifice valve in its inactive normal setting by means of a spring arranged in the pressure chamber.

3. A brake system according to claim 1, wherein the first and second check valves are connected in series in terms of effect relative to the pressure chamber such that the pressure medium of the wheel brake can escape through the pressure chamber to the pressure medium source.

4. A brake system according to claim 1, wherein the check valves are structurally positioned on the final control element.

5. A brake system according to claim 1, wherein the check valves are designed as collar valves.

6. A brake system according to claim 1, wherein the final control element includes an annular piston that receives the first check valve that is exposed to the direct pressure of the pressure medium source in the area of a large, front cross section, while the second check valve seals off the pressure chamber along a shell-shaped section of the annular piston in the direction toward the pressure medium connection of the wheel brake.

7. A brake system according to claim 6, wherein the second check valve is fixed to an annular part that is attached to the housing.

8. A brake system according to claim 6, wherein the shell-shaped end section of the annular piston is positioned in a sealed manner on a thin, sheet metal part that features at least one orifice opening and that is anchored rigidly to the housing.

9. A brake system according to claim 6, wherein the annular piston is arranged coaxial to a valve push rod of the pressure modulation valve that is open when in the normal position.

10. A brake system according to claim 9, wherein the annular piston is guided in a translational direction on a shell shaped valve seat body of the pressure modulation valve, wherein the pressure modulation valve is arranged upstream of the control orifice valve.

* * * * *